July 16, 1940.     H. ROLAND     2,207,875
GYROSCOPE
Filed Jan. 19, 1938     3 Sheets-Sheet 1

INVENTOR.
Henrich Roland
BY Stephen Cerstvik
ATTORNEY.

July 16, 1940.    H. ROLAND    2,207,875
GYROSCOPE
Filed Jan. 19, 1938    3 Sheets-Sheet 2
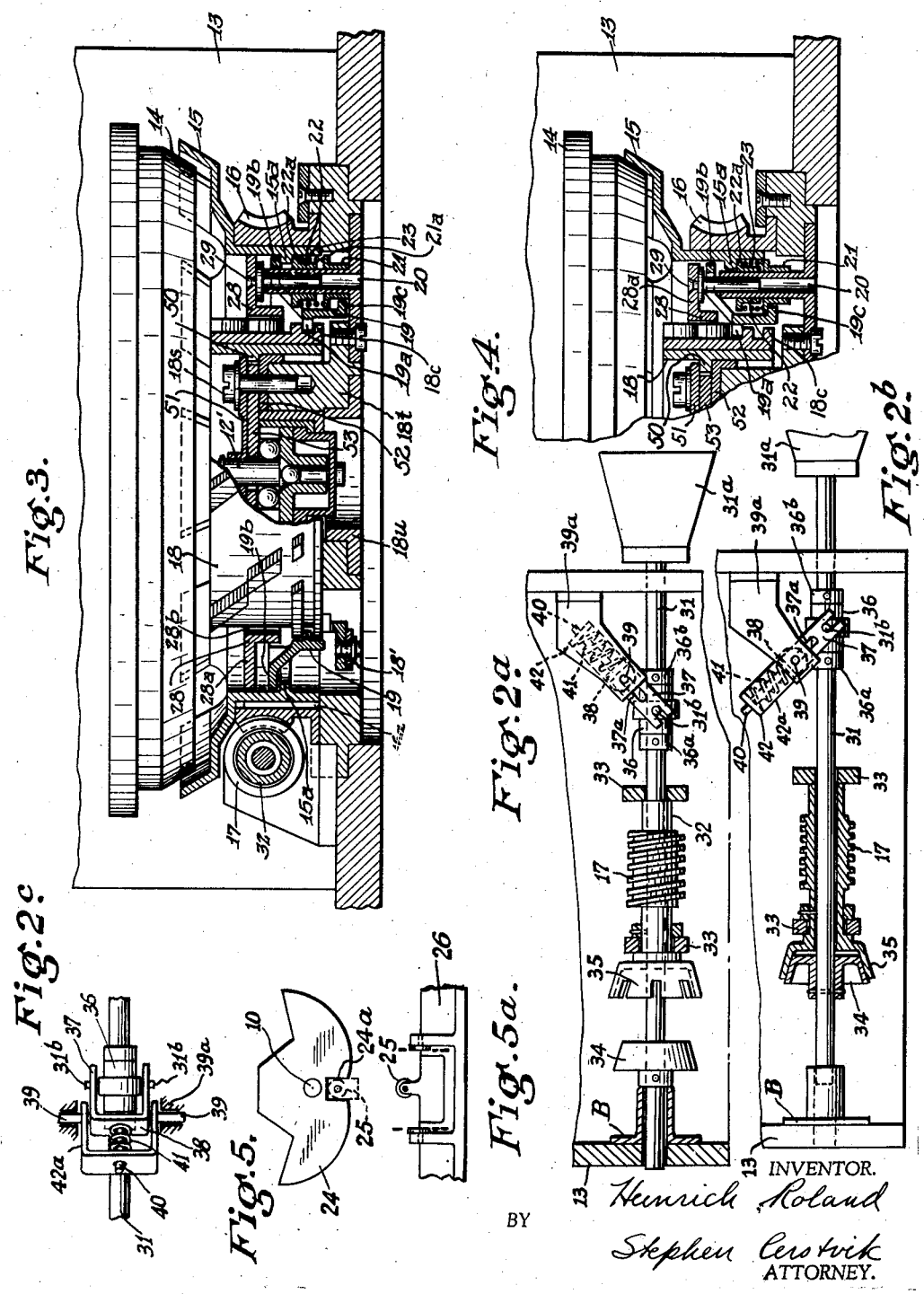
INVENTOR.
Henrich Roland
BY Stephen Cerotvik
ATTORNEY.

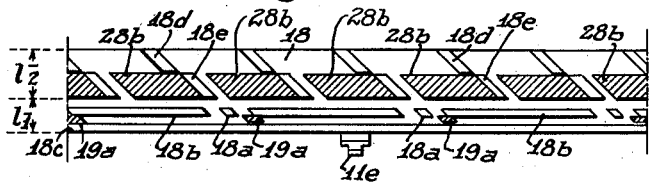
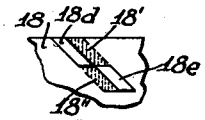
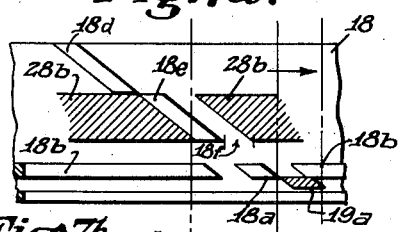
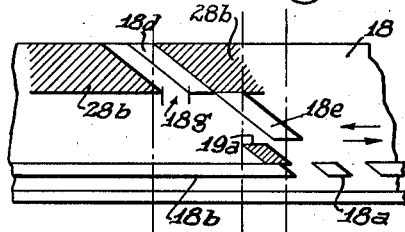
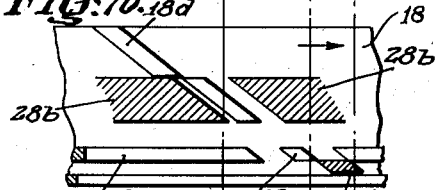
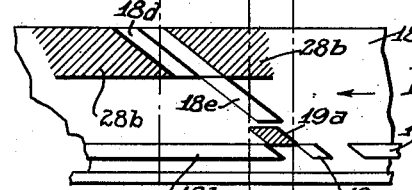
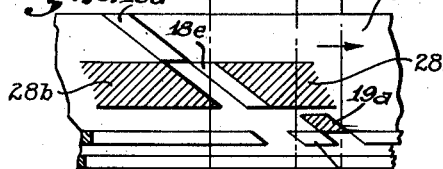
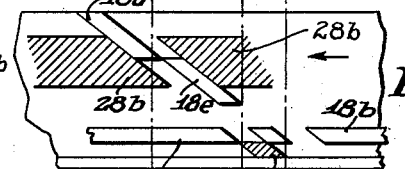
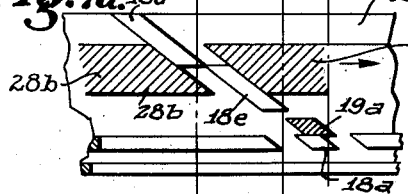
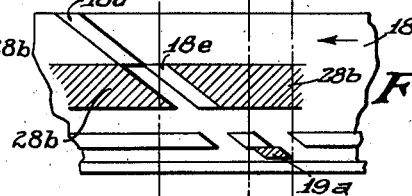
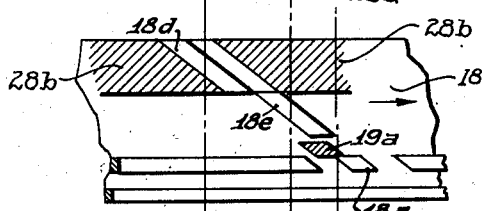

Patented July 16, 1940

2,207,875

UNITED STATES PATENT OFFICE 2,207,875

GYROSCOPE

Heinrich Roland, Berlin-Steglitz, Germany, assignor to Siemens Apparate und Maschinen Gesellschaft mit beschränkter Haftung, Berlin, Germany, a corporation of Germany Application January 19, 1938, Serial No. 185,758
In Germany July 31, 1936

7 Claims. (Cl. 74—5)

This invention relates to gyroscopes and particularly to directional gyroscopes adapted for axes adjustment.

It is often necessary to establish the axes or to clamp in a fixed position the mounting of a directional gyroscope, for example, an automatic gyro-pilot for aircraft, in order to prevent the tumbling of the gyroscope when sudden changes in attitude are made. It is also often necessary to clamp or establish the axes of the gyroscope mounting in order to readjust the direction indicator. The readjustment of the direction indicator is usually accomplished by a manually operated knob which, by means of a clutch, is connected to the Cardan ring mounting of the gyroscope and adapted for moving the ring in azimuth. This azimuth adjustment must be effected when the plane of rotation of the gyroscope is perpendicular and hence when the axis of rotation is horizontal. If the axis of rotation is not horizontal, it must be made so by a suitable leveling device; otherwise rotation of the Cardan ring will cause tumbling of the gyro. If it is necessary to move this axis into the horizontal, a precessing moment will be produced which will tend to move the Cardan ring in azimuth. Therefore, in order to avoid the precessing moment, the Cardan ring must be clamped and fixed in position by the clutch means before the axis of rotation of the rotor is forced into the horizontal and thus before the plane of rotation is forced into the vertical; otherwise if clamping of the Cardan ring followed, even a short time after the erecting of the plane of rotation of the rotor, the mechanism would be subjected, as above mentioned, to a disturbing precession in azimuth which, if communicated to a gyrocontrolled mechanism, such as an automatic pilot, would make excessive load demands upon the control apparatus of the pilot and cause dangerous flying conditions in addition to causing large course deviations.

One of the objects of the present invention is to provide novel means for establishing and adjusting the axes of a directional gyroscope wherein disturbing precessional moments are avoided.

Another object of the invention is to provide novel adjusting means for a directional gyroscope which are compact and dependable in operation.

A further object is to provide novel means for preventing a directional gyroscope from tumbling when sudden changes are made in the attitude of the vehicle upon which it is mounted.

An additional object is to provide novel means for readjusting a gyroscope to a predetermined position.

The above and further objects and advantages will appear more fully hereafter in the detailed description which is to be read with the accompanying drawings, wherein like reference characters refer to like parts throughout the several views, and wherein, Fig. 1 is a side elevation, partly in section, showing one embodiment of the invention;

Fig. 2a is a view, partly in section, illustrating details of the device shown in Fig. 2;

Fig. 2b is a view similar to Fig. 2a but illustrating the parts in another position;

Fig. 2c is a view illustrating a detail of Figs. 2a and 2b;

Fig. 3 is an enlarged view of the axes clamping means shown partly in section and with parts broken away;

Fig. 4 is a detailed view, partly in section and with parts broken away, showing a portion of the mechanism of Fig. 3 in the operating position;

Figs. 5 and 5a are front elevations with parts broken away, of one embodiment of the clamping device for the axis of rotation;

Fig. 6 is a development on an enlarged scale of a threaded cam portion of the clamping or fixing device;

Fig. 6a is a portion of the threaded development shown in Fig. 6; and,

Figs. 7a to 7i, inclusive, are developments on an enlarged scale of portions of the threaded clamping means showing the threads in successive operating positions.

The form of the invention illustrated in the accompanying drawings, by way of example, is a device for enabling the adjustment of the directional axis of a directional gyroscope by means of clamping and rotating mechanism which is adapted for operation in such a manner that the tumbling of the gyroscope and disturbing precessional moments are avoided. The clamping or fixing and adjusting means are constituted by a plunger mechanism which actuates cam means which, in turn, operates first a clutch which engages the Cardan ring mounting, and second a cam and detent device for moving the axis of rotation into the horizontal, if necessary, thus erecting the plane of rotation of the gyroscope. It is to be noted that the Cardan ring clutch is engaged prior to the operation of the detent in order to avoid the disturbing precession in azimuth which would be produced if the sequence of operation called for first leveling the horizontal axis by said detent device. The operation of the plunger engages a second clutch which is adapted, upon rotation of the plunger shaft, by means of a worm and wheel, to rotate the Cardan ring for azimuth readjustment.

Figure 1:
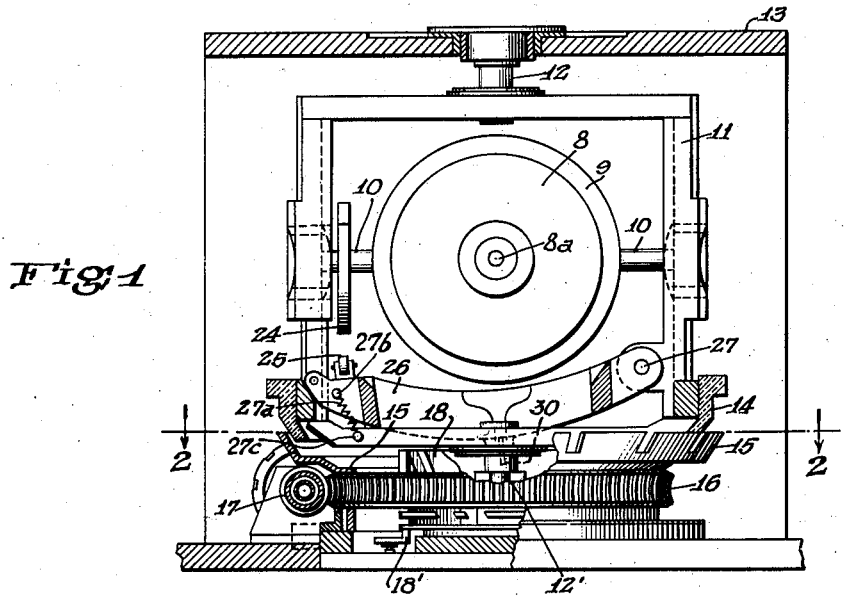

In the form illustrated in Fig. 1, a gyroscope is mounted in the conventional manner and is adapted to act, for example, as a direction indicator. The gyroscope 8 having a rotating shaft 8a is mounted in a housing 9 which, in turn, by means of a horizontal shaft 10 is mounted upon a Cardan ring 11. The Cardan ring is mounted by means of a vertical shaft 12, 12' upon a frame member 13. The vertical shaft 12 in the embodiment shown serves as the directional shaft and, therefore, is adapted for controlling a compass rose or other suitable direction indicating means.

Novel means are provided for controlling the axes of the groscope mounting comprising a cone clutching device for the Cardan ring and hence the vertical axis, and a cam and detent mechanism for the horizontal shaft and hence the axis of rotation. The latter mechanism is adapted for erecting, if necessary, the plane of rotation of the rotor and thus for forcing the axis of rotation into the horizontal. Cam means are provided for actuating and governing the sequence of operation of the clamping mechanism such that the cone clutch acting upon the Cardan ring is engaged before the action of the cam and detent upon the horizontal shaft. This sequence is necessary in order to avoid the disturbing precession which would be produced if the plane of rotation were erected first.

The clutching means for the Cardan ring is constituted by the frustro-conical member 14 attached to said ring and by a clutch crown 15 which is keyed by keying means 16a (see Fig. 3) within a worm wheel 16 and adapted for longitudinal movement relative thereto. The worm wheel 16 is rotatably mounted upon the frame member 13 and meshes with a worm 17. In a manner to more fully appear hereinafter the worm 17 is rotated, and, by means of the wheel 16 and clutch crown 15, turns the Cardan ring and thus enables the adjustment of the directional axis of the apparatus.

The novel cam means for controlling the ring and shaft clamping mechanism is constituted by a cylindrical two-part member 18, the outer surface of the outer member of which is provided with a series of slanting threads which, as above mentioned, act as cams. The outer member is shrink fitted to the inner member thereby forming the two-part cylinder member 18. The cam cylinder 18 is rotatably mounted upon the frame member 13 but is not longitudinally displaceable relative thereto. The inner portion of the two-part cam cylinder 14 is provided with an inwardly extending flange portion 50 resting between a cover plate 51 and a member 52 resting upon the supporting member 18t. A spacer washer 53, of substantially the same width as the flange of the cylinder is provided between the cover plate 51 and the member 52. The cover plate 51, spacer washer 53, and member 52, are secured to the supporting member by suitable means such as screw 18s. The cam cylinder 18, as will be readily apparent, is mounted for rotation about the boss 18u and its rotation about the latter is guided by the flange 50 disposed within the space formed between the cover plate 51 and the member 52 at the outer periphery of the spacer washer 53. There are two fields of threads or cams upon two-part member 18, i. e., fields $l_1$ and $l_2$, as shown in Fig. 6. The former governs the cone clutch 14, 15 for the Cardan ring 11 and the latter controls in a manner to be later explained the cam and detent device which acts upon the horizontal shaft 10.

Means are provided for interconnecting the cam field $l_1$ of cam cylinder 18 and the cone clutch 14, 15 comprising a ring 19 with spaced teeth 19a upon the inner periphery thereof which act as cam followers upon cam threads 18a and 18b. Ring 19 is provided with an annular flange 19b which rests upon an inner annular lip 15a of clutch crown 15, and is adapted for retaining or thrusting downward said clutch crown.

In order to facilitate the above-mentioned cam action between cylinder 18 and ring 19, means are provided to prevent the rotation of said ring but to permit the longitudinal displacement thereof, comprising hollow pins which are attached to the frame 13 at 120° intervals beneath ring 19 and extend through suitable openings in said ring. It is seen that flange 19b is above lip 15a. It is, therefore, necessary to have some means for holding or thrusting said lip upwardly into contact with the flange 19b in order to insure that cam cylinder 18 controls the clutch crown 15. These means are constituted by two bushings 21 and 22 for each pin provided at the upper ends thereof with annular flanges 21a and 22a, respectively. The bushings are fitted upon the hollow pins 20. A spring 23 yieldingly separates the bushings and resiliently urges bushing 22 against lip 15a which, in turn, is urged against the annular flange 19b.

In order to enable the cam follower 19 upon the upward motion thereof to lift the lower bushing 21, a fork member 19c attached to member 19 is provided for each of said bushings and is adapted for engaging the lower surface of the bushing flange 21a.

In the form shown in Fig. 3, the cam cylinder 18 and follower 19 are in the low or disconnected position, i. e., the follower ring 19 has disengaged clutch 14, 15. The spaced teeth 19a of the follower are here held between an annular ring 18c of the cylinder 18 and the cam threads 18a, 18b. The follower teeth are resiliently urged upwardly by means of the spring 23 which, through bushing 22 and inner lip 15a, thrusts upwardly against the flange 19b to which are attached said teeth. A development or unwrapping of the cam cylinder on an enlarged scale is shown in Fig. 6 wherein appears the relative position of the cam and follower which corresponds to that shown in Fig. 3. Figs. 7a to 7i, inclusive, reproduce, on a still larger scale, the development of the cam cylinder and illustrate in detail successive relative displacements of the cam and follower which occur in one reciprocating trip of said follower. The cam and follower for actuating the establishing mechanism for the horizontal axis is also shown and will hereinafter be fully explained.

In the inoperative or disengaged position, the cam followers and cam threads have the relative positions as shown in Fig. 7a. Here the follower 19a, as above mentioned, is resiliently urged upwardly against thread 18b by means of the spring 23. If the cam cylinder 18 is rotated as set out in detail later to the right in the direction of the arrow, the resulting relative position after a short angular displacement is shown in Fig. 7b wherein the follower 19a has become located in the position between the threads 18a and 18b and upon further rotation of said cylinder, the follower will be forced, by the cam action of the threads, upward until the position shown in Fig. 7c is reached.

During the above-described operation, the cam following ring 19 was progressively urged upwardly, thus allowing spring 23 to act through bushing 22 and to displace longitudinally lip 15a and thus clutch crown 15. This initial displacement, however, is effective for a distance equal to only a fraction of the thickness of the cam threads and is not sufficient to cause engagement of the clutch 14, 15. Further displacement of the clutch does not occur until the cylinder 18 is again rotated and the lower bushing 21 is entrained by the fork connection 19c of ring 19. The lifting of this lower bushing will longitudinally displace the spring 23, the upper bushing 22, and hence the clutch crown 15 through inner lip 15a which clutch crown will engage the frustro-conical portion 14 and will clamp the same in position. The engagement of clutch 14, 15 occurs prior to the termination of the upward motion of the cam follower ring 19. Therefore, the follower ring 19 is lifted above the inner lip 15a since crown 15 does not participate in the last part of the upward stroke of the follower. The resulting position is shown in Fig. 4 wherein the spring 23 in tending to separate the two bushings 21 and 22 has the double effect of holding clutch 14, 15 in the engaged position and of resiliently thrusting cam follower ring 19 downward in such a manner that, as shown in Fig. 7d, the tooth 19a and the thread 18a are in yielding contact. Further rotation of the cam cylinder will cause tooth 19a to slide over 18a until it clears the same, whereby upon continued rotation of 18 as shown by the arrows, the cam action of teeth 18b allows tooth 19a to assume the position shown in Fig. 7f. The latter shows, for a purpose to more fully appear hereafter, the limit of angular displacement of said cam cylinder.

The disengagement of clutch 14, 15 is effected by a reverse rotation of cylinder 18 which will cause a reversal of the procedure outlined above except that tooth 19a is caused to descend on the opposite side of thread 18a between the adjacent thread 18b. The successive positions are illustrated in Figs. 7g to 7i, inclusive. Further angular displacement causes the moving parts to regain the position shown in Fig. 7a.

Novel means are provided for erecting, if necessary, the plane of rotation of the rotor and leveling the axis of rotation and there retaining said plane and axis comprising a plate cam 24 attached to the horizontal shaft 10, as illustrated in Fig. 5. At the central portion of cam 24 there is provided an indentation or notch 24a suitable for the retention of a cam follower 25 which acts as a detent and is attached to an arm 26 which is pivotally mounted upon Cardan ring 11 by means of a pin 27. The arm 26 is confined to pivotal motion in a single plane and is held in an inoperative position by means of a spring 27a connected to arm 26 by pin 27b and to the frame by pin 27c such that the follower 25 does not normally engage plate cam 24. When the detent follower 25 is in the notch 24a, the plane of rotation of the gyroscope is vertical and the axis of rotation is horizontal. If said plane of rotation is not in the vertical, the plate cam 24 will not be centralized and an upward swing of arm 26 will cause follower 25 to seek the notch 24a and thus to erect the plane of rotation.

Means are provided for moving arm 26 in proper relation to the movement of clutch crown 15 comprising cam field $I_2$ of cam cylinder 18 as shown in Fig. 6. Field $I_2$ communicates its motion to arm 26 by means of a second annular cam follower 28 having an annular flange portion 28a and suitable cam following teeth 28b. Follower 28 is prevented from rotating and is adapted for longitudinal displacement only by means of pins 29 which fit within the hollow pins 20. The pins 29 are attached to flange 28a. Arm 26 is operatively connected to flange 28a by means of downwardly extending pins 30 (Fig. 1) the ends of which pins abut said flange in a manner well known and thereby cause said arm to follow the longitudinal reciprocations of the flange 28a caused by the movement of the cam cylinder 18.

The cam threads of field $I_2$ (Fig. 6) which control the movements of the arm 26 are constituted by adjacent double slanting thread portions 18d and 18e. It is to be noted that these two threads are formed from a single slanting thread by milling away the hatched portions, as illustrated in Fig. 6a. It also is to be noted, as above mentioned, that the cam follower teeth 19a and 28b are not adapted for relative rotation but only for relative longitudinal displacement.

As above set forth, it is necessary that the Cardan ring be engaged or clamped prior to the leveling of the axis of rotation of the gyroscope. Therefore, the phase relation of the two sets of teeth following the cam thread fields $I_1$ and $I_2$ must be such that follower 19 is first entrained and upwardly displaced. This is accomplished by adjusting said phase relation so that a gap 18f exists between the follower teeth 28b and the cam threads 18e (Fig. 7a) at the outset of the movement of the threads. The size of this gap determines the delay in the operation of the plate cam 24 and hence in the leveling of the horizontal axis. The cam follower teeth 28b correspond in thickness to the cam threads 18e and 18d. The initial position is shown in Fig. 7a wherein the right flanks of teeth 28b rest against the left flanks of the threads 18e. Upon the rotation of cylinder 18, there occurs a lag or delay in the operation of field $I_2$ and follower 28 caused by the gap 18f. During this delay, as above described, the follower 19 is coacting with field $I_1$ to operate the clutch crown 15. Further rotation of the cam cylinder causes the threads 28b to take the positions shown in Figs. 7b to 7e, inclusive. In Fig. 7e, tooth 28b has arrived at the position of maximum longitudinal displacement and the horizontal axis is here leveled. In order to prevent the spring 27a from causing an involuntary reversal of the process so far completed, the cylinder 18 is rotated an added small amount which causes follower 28b to rest upon the upper ledge of thread 18e. This is effected without additional longitudinal displacement and is represented in Fig. 7f, wherein the left flank of tooth 28b rests against the right flank of cam thread 18d and the final rotation in this direction is reached.

The cam threads of fields $I_1$ and $I_2$ are so disposed that upon a reverse rotation of cylinder 18 the cam followers descend simultaneously and thus release the gyroscope axes at the same time. The positions taken by the cam threads and followers upon reverse rotation are shown in Figs. 7f to 7i, inclusive. It is seen in Fig. 7f that a gap 18g exists between tooth 28b and thread 18d. The position of the descending passage for tooth 19a between threads 18b and 18a must be located such that when the gap 18g has been traversed by tooth 28b the tooth 19a will be at the upper mouth of said passage. Thus, downward displacement of teeth 19a and 28b will occur simultaneously as shown in Figs. 7g to 7i, inclusive.

Figure 2:
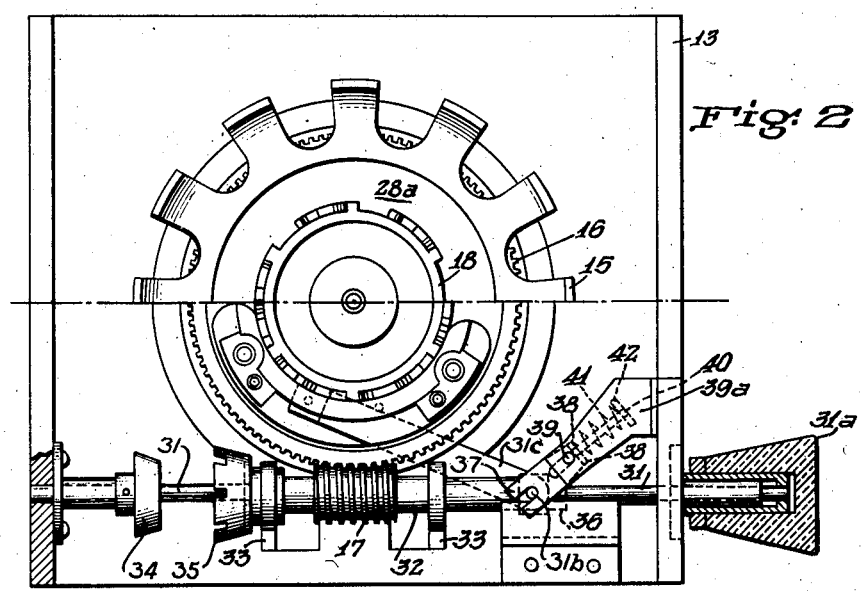
Fig. 2 is a view, partly in section and partly in elevation, taken substantially on line 2—2 of Fig. 1.

Novel means are provided for rotating cam cylinder 18 to the operative position and immediately thereafter for engaging a small clutch which permits the rotation of worm 17 and hence the azimuth adjustment of the vertical axis 12 of the gyroscope mounting. The means are constituted by a plunger 31 which is rotatably mounted upon frame 13 and passes through a hollow shaft 32 upon which is mounted the worm 17. Plunger 31 is provided with a handle 31a. Shaft 32, in turn, is mounted upon bearing blocks 33. Rotation of plunger 31 is communicated to shaft 32 by means of a clutch constituted by a cone member 34 upon plunger 31 and a clutch rim 35 upon the hollow shaft 32. An arm 31c pivotally mounted upon a pin 18' of cylinder 18 is also pivotally mounted by means of a pin 31b upon plunger 31 and is adapted for causing said cylinder to rotate when the plunger is longitudinally displaced. The pin 31b is attached to a bushing 36 (see Figs. 2a, 2b, and 2c) which accompanies the longitudinal motion of the plunger 31 due to rings 36a and 36b but does not rotate therewith. A tumbling switch acts to hold plunger 31 firmly at the two end positions and is constituted by a double forked lever 37 provided with slots 37a, one end of which lever rides on pin 31b and the other end terminating in flange 38, said lever 37 being mounted for oscillation about pin 39 located in slot 37a. Pin 39 is mounted upon arm 39a attached to frame 13. A rod 40 is carried by flange 38. A coil spring 41 is held upon rod 40 by means of a flange 42 forming part of the double forked lever 42a. Therefore, movement of plunger 31 for example to the right as seen in Figs. 2 and 2a will compress spring 41 until the mid-point of the displacement is reached. Extension of the spring occurs thereafter see Fig. 2b and insures the full longitudinal displacement of said plunger.

In order to allow the rotation of worm 17 only when in the operative position, cone member 34 is so positioned upon plunger 31 that engagement of member 34 with clutch rim 35 occurs only when said plunger is withdrawn to the position of maximum displacement.

In operation, should it be necessary to establish the axes of the gyroscope in order to make an azimuth adjustment or to execute some sudden change in attitude of the vehicle, the plunger 31 by means of handle 31a is withdrawn or pulled outwardly. The spring loaded tumbling switch 37 at the outset resists the withdrawal until the mid-point of the displacement is reached when extension of spring 41 assists the movement and thrusts the plunger to the new position. This longitudinal displacement of the plunger is communicated to cam cylinder 18 by means of arm 31c which causes the cylinder to rotate and, as above described, first to engage clutch 14, 15 and immediately thereafter to operate the cam and detent mechanism 24, 25, 26. Thus, rotation of the Cardan ring is prevented about the vertical axis and the axis of rotation is leveled. The small clutch 34, 35 is finally engaged when the plunger is fully withdrawn. Rotation of handle 31a will now adjust the directional axis of the gyroscope by means of clutch 34, 35, worm and wheel 17, 16 and clutch 14, 15. Upon the return movement of the plunger, first the clutch 34, 35 is disengaged and immediately thereafter, a simultaneous release of the Cardan ring and leveling means occurs in the manner above set forth. The uncoupling of clutch 34, 35 prior to this release prevents an azimuth adjustment when said axes are not fixed.

There is thus provided a novel device for controlling the axes of a gyroscope which may be used for adjusting a directional gyroscope in azimuth. It is so constructed that tumbling or wandering of the gyroscope is prevented while the adjustment is being made. It is positive in operation, ruggedly constructed with a minimum of working parts and is easy to operate. The mechanism may be installed within a small space and is light in weight.

Although only one embodiment of the invention has been illustrated and described in detail, it is to be expressly understood that the invention is not limited thereto. Various changes may also be made in the design and arrangement of the parts illustrated without departing from the spirit and scope of the invention, as the same will now be understood by those skilled in the art. For a definition of the limits of the invention, reference will be had primarily to the appended claims.

What is claimed is:

1. In apparatus of the class described, a gyroscope having a Cardan ring suspension, a cam coaxial with the vertical axis of said suspension, a clutch coaxial with said cam, said clutch adapted for engaging said Cardan ring, means for causing said cam to actuate said clutch, an arm pivotally mounted upon said Cardan ring, a cam follower upon said arm, a cam mounted upon the horizontal shaft of said suspension, means for causing said first-named cam to move said arm to cause said follower to engage said cam after the engagement of said clutch, said first-named cam adapted for simultaneously releasing said clutch and arm, and means operable after the engagement of said cam and follower for rotating said clutch.

2. In apparatus for controlling the rotation of a gyroscope mounting about the vertical axis thereof and for leveling the axis of rotation of said gyroscope, clutch means for clamping said mounting, a rotatable element, cam means on said element, a follower, means resiliently urging said clutch means, said follower and said cam means into contacting relation, means for rotating said rotatable element whereby said cam means move said follower and said resilient means moves said clutch, means operative upon further rotaton of said rotatable element whereby said resilient means additionally moves said clutch to clamp said mounting, and a second cam means on said element, means cooperating with said second cam means whereby said axis of rotation is leveled, said second cam means being located in such phased relation with respect to said first cam means that said leveling occurs only after said clamping.

3. In apparatus for controlling the rotation of a gyroscope mounting about the vertical axis thereof and for leveling the axis of rotation of said gyroscope, a rotatable element co-axial with said vertical axis of suspension, means reciprocally operable for rotating said element, snap-action means cooperating with said reciprocating element to retain the same in either limit of its movement, cam means on said element, follower means axially movable upon rotation of said element and cam means, means operable upon said axial movement to clamp said mounting, and a second cam means on said element, means axially movable upon rotation of said element and said second cam means, and means movable upon said axial movement to level the axis of rotation of said gyroscope.

4. In a device of the character described, a gyroscope having a Cardan ring suspension, a cam rotatable about an axis coaxial with the vertical axis of suspension of said Cardan ring, a cam follower, a clutch, and resiliently operated means between said follower and said clutch, said resilient means moving said clutch upon partial rotation of said cam and said resilient means moving said clutch into contact with said ring upon further rotation of said cam.

5. In a device of the character described, a gyroscope having a Cardan ring suspension, means rotatable about an axis coaxial with the vertical axis of said suspension, two sets of spaced cam means on said rotatable means, means including said spaced cam means operable upon rotation of said rotatable means for sequentially locking said gyro about its vertical axis and leveling said gyro about its horizontal axis and means operable upon reverse rotation of said rotatable means for simultaneously releasing said locking and leveling means.

6. In a device of the character described, a gyro having a Cardan ring suspension, clutch means for locking said ring about its vertical axis, a follower, cam means mounted for rotation about an axis coaxial with the vertical axis of suspension of said gyro, said cam means comprising a series of spaced, inclined elements, an inclined element on said follower, means resiliently urging said follower element and said cam elements into operative relation, means operable upon rotaton of said cam means whereby said inclined elements coact to move said follower axially, and means operative upon said axial movement moving said clutch into locking engagement with said ring.

7. In a device of the character described, a gyroscope having a Cardan ring suspension, a cam mounted coaxially with the vertical axis of said suspension, a pivoted arm, a follower, means on said follower and cam whereby said follower is moved axially upon rotation of said cam, and means connecting said follower and pivoted arm whereby axial movement of said follower levels said gyro about its horizontal axis.

HEINRICH ROLAND.